Patented Aug. 12, 1947

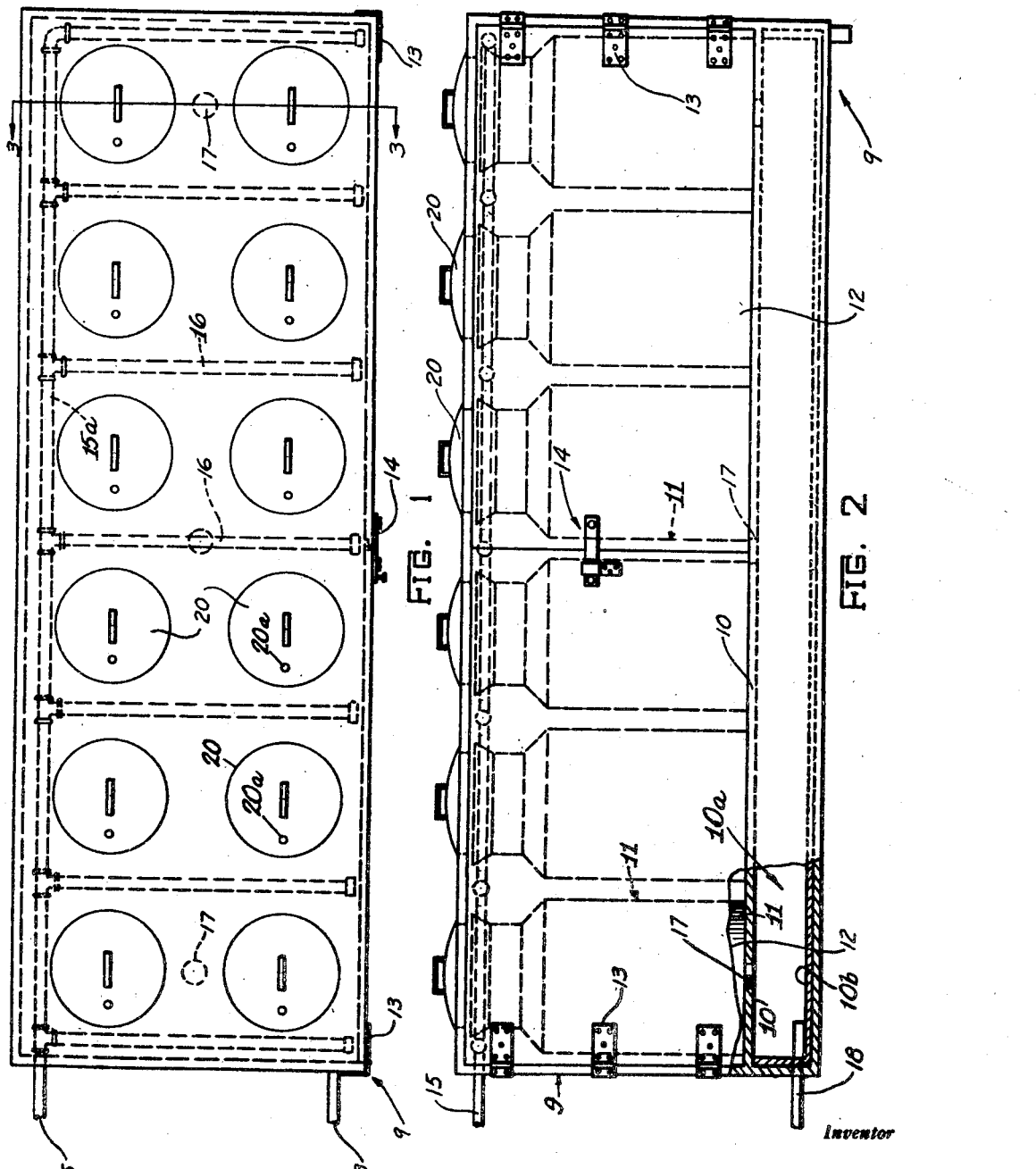

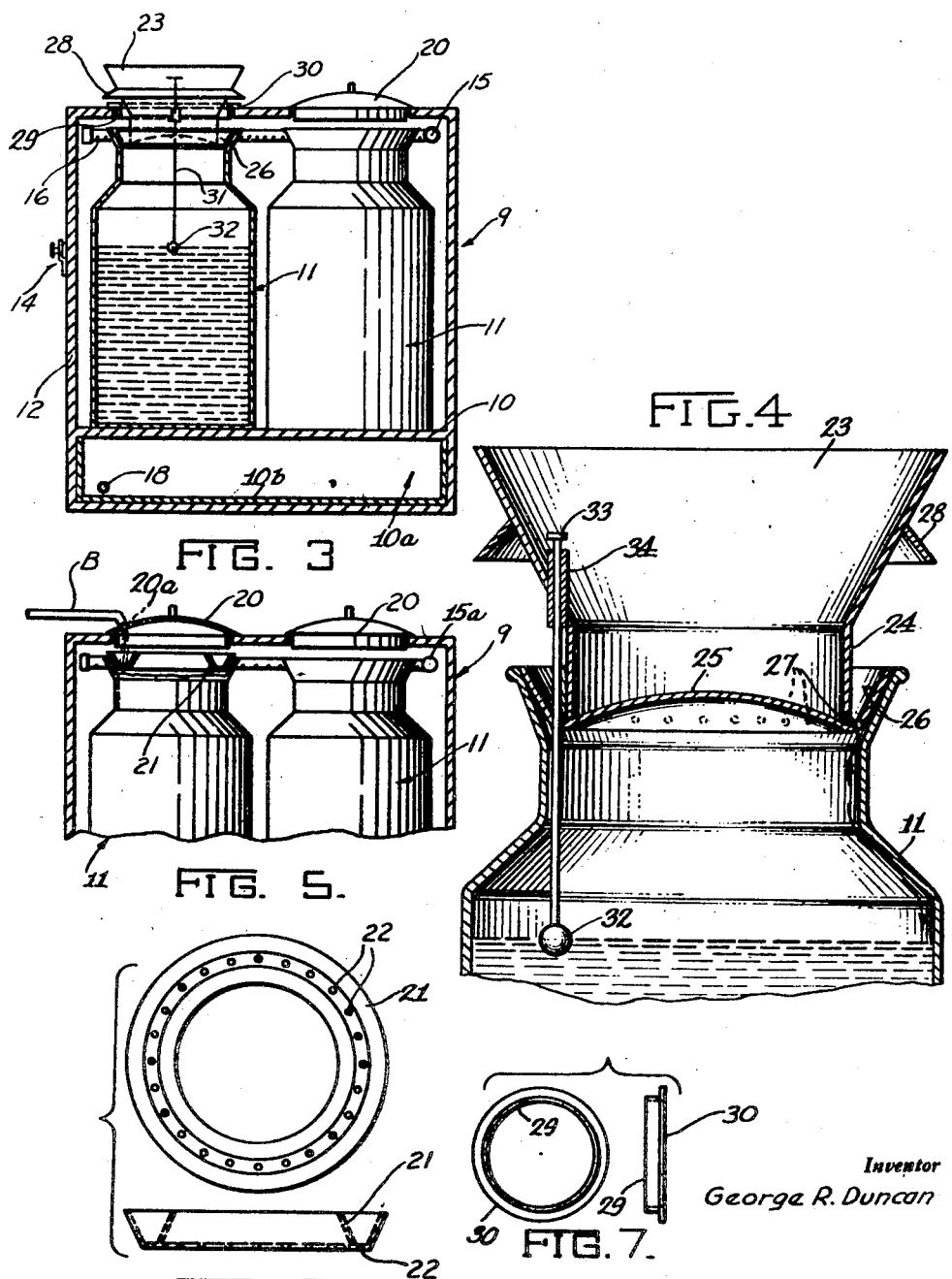

2,425,519

UNITED STATES PATENT OFFICE 2,425,519

MILK COOLER

George R. Duncan, Washington, Mo.

Application October 23, 1944, Serial No. 559,943

10 Claims. (Cl. 62—141)

This invention relates to certain new and useful improvements in milk can filling, milk and can cooling and cold storing cabinets of elongated chest-types such as are currently used in present day milk houses and has more particular reference to an especially constructed refrigerator cabinet which makes milk cooling easier, more convenient, more profitable and faster, the construction of the cabinet being such that the handling of cans, both empty and filled, is appreciably expedited.

More specifically, the improved cabinet is characterized by a multiple wall structure defining a compartment for receiving and enclosing empty milk cans for cooling and storage, the top wall of said cabinet having opening means therein affording access to said compartment, the lower portion of the cabinet being provided with a drainage sump, means being provided and confined in said compartment for spraying a cooling liquid exteriorly against the upright cans, and means being provided for supporting the milk cans in upstanding alignment with the opening means in said top wall and in position to receive the spray against the neck portions of the cans, said means comprising a perforated horizontal partition forming the bottom of said compartment as well as the top of said sump, and the second mentioned means comprising a liquid supplying header and a series of parallel branch pipes connected thereto and having spray perforations therein arranged to direct the cooling liquid therefrom against the cans' necks in an aptly suitable and efficient manner.

Another object has to do with a novel milk and cream refrigerator of the type specified wherein the user merely places the empty cans in the cabinet, places the milk strainer in proper openings in the top of the cabinet, and pours the milk through the strainer or funnel into the can, water at a temperature of about 33° being sprayed on the sides of the can, whereby when a bucket or pail of milk is poured into the can, it agitates the milk already in the can, the latter functioning as an aerator and animal heat and odors being thus substantially eliminated.

Other features and advantages will become readily apparent from the following description and the accompanying illustrative drawings.

In the drawings, wherein like numerals are employed to designate like parts throughout the same:

Figure 1 is a top plan view of a refrigerator cabinet for standard milk cans constructed in accordance with the principles of the instant invention.

Figure 2 is a front elevational view of the same with portions broken away and shown in section.

Figure 3 is a view, partly in section and partly in elevation, which may be said to be a transverse vertical section, this illustrating and showing the use of one of the can filler-funnels.

Figure 4 is an enlarged sectional view showing the special milk pouring funnel in section and illustrating same fitting into the neck of a standard milk can, the latter being shown fragmentarily.

Figure 5 is a view of a modification showing a simple distributor ring or trough for can filling purposes.

Figure 6 is a collective or group view showing plan and elevational views of the simple trough-like filler ring.

Figure 7 is a similar group view showing bottom and edge elevations of a collar used in connection with the funnel seen in Figure 3.

By way of introduction to the detailed description, it will be noted that the invention has to do with means for refrigeration and storage of milk in standard milk cans which is characterized by a cabinet having vertical front and rear walls connected by vertical end walls as well as top and bottom horizontal walls, all arranged and coacting to define a compartment which lends itself for reception of said milk cans and to expedite the steps of hand powering, can filling, and cooling and storing the thus filled can. The front wall has appropriate opening means therein to permit the milk cans to be introduced into or withdrawn from said compartment, movable closure means being provided for said opening means. Coacting with the front opening means, the top wall of the cabinet is provided with selectively usable openings and these openings are arranged and of such diameters as are required for handy access to be had to said compartment and the milk cans therein. Removable covers are provided for said top openings. Then, too, a false bottom is fitted and arranged horizontally in the cabinet and this is coextensive in area with the cross-sectional area of said compartment and spaced downwardly from said top wall a predetermined distance such as to position the top edges of the cans just slightly below the undersurface of said top wall, said false bottom constituting a supporting stand for the cans, being in alignment with the lower edge of the front opening means, arranged to be but a slight distance above the surface supporting said cabinet to render easy the steps of inserting and removing said cans, and coacting with complemental portions of the walls of said cabinet to define a sub-compartment underlying said first-named can compartment and thus providing not only for drainage purposes but defining a receptacle which is usable for a force fed cooling media or, generally speaking, refrigerating means.

The invention is characterized, as is evident from the foregoing, by several phases. Therefore, we may as well start with the cabinet itself, this being an essential phase and being denoted generally by the numeral 9. It is of general rectangular form and may be of any appropriate dimensions, materials and shape. My improved cabinet has an elevated bottom 10 to properly support the milk cans 11 and to serve as a sort of low lying shelf for convenient lifting, lowering, insertion, removal, and easy handling of said cans. This elevated or false bottom 10 coacts with the main bottom and surrounding walls to define a chamber or compartment 10a, this for trapping the water after it has been utilized for cooling purposes. If desired, this compartment or chamber can be suitably lined as at 10b. It can in certain instances be charged with cracked ice (not shown) to assist in the refrigerating results. It even lends itself to the incorporation of cooling coils, (not shown) to add to the overall cooling capacity of the cans. On one vertical side, preferably the so-called front, the cabinet is provided with a pair of horizontally swingable doors 12, these hingedly mounted in place as at 13 and having their adjacent ends connected together by appropriate latch means 14. Iced water, which is used as the cooling agent, is delivered into the top of the cabinet on the interior through pipe 15, which discharges through header 15a (see Figures 1, 2 and 5) and the header extends the full length of the rear part of the cabinet and is provided with lateral transversely extending branch pipes 16 at longitudinally spaced points. The pipes 16 are parallel to one another and extend between the pairs of cans which are arranged in pairs in the cabinet and the lower portions thereof are provided with a multiplicity of perforations to permit the cold water jets to spray down around the underlying cans. Thus, we have a convenient overhead or ceiling type distributor pipe-system for the refrigerated water or other cooling liquid. The water accumulates on the shelf or bottom and flows down through drain holes 17 into a drainage sump where it is properly trapped and then drained off by a discharge pipe 18 located in and leading from said trapping and drainage chamber 10a. It will be noted that the top of the cabinet is provided with funnel openings or hand holes which register with the necks of the milk cans and that the milk can tops or other suitable lids 20 are seated in and cover these holes.

Attention is directed at this stage to Figure 5, which shows a simple means of delivering milk into the can 11 by a milk supply pipe B. A point to be noted here is the fact that the lid 20 is provided with an opening to accommodate the discharge nipple or end of the pipe B. The main factor to be brought out however, is the fact that the milk is delivered and fed in a thin film down and around the interior walls of the can, this being accomplished by a distributing ring 21. The ring, as shown, is of annular form and substantially V-shaped and trough-like in cross-sectional form. The trough provides a collecting and distributing channel and the milk is delivered down through the apertures in the bottom of the channel indicated at 22. Consequently, this is a novel way of taking the milk in and feeding it as a film into the can while the exterior surfaces of the can are being cooled with dripping water from the overhead pipe jets.

Somewhat the same idea is carried out in the use of a trough or pan provided (see Figure 4) on the funnel. Here I provide an annular funnel 23 whose cylindrical discharge neck 24 is provided with a pan having a concavo-convex central portion 25 and a marginal rim 26, the rim having discharge openings registering with the milk can neck. The neck 24 is attached to the pan 25 and the discharge openings are provided as at 27 allowing the downwardly flowing milk to enter the pan or trough 26 and then to discharge into the milk can. The numeral 28 indicates merely a shield in the form of a depending flange which shunts overflowing milk onto the top of the cabinet. It may be desired also to provide a collar 29 with a flange 30 to assist in accomplishing best results. The collar is merely "snapped" and fitted into one of the openings in the top of the cabinet and thus the flange 30 underlies the flange 28, the two flanges together forming a sort of a closure fitting to prevent splashing milk running down into the open milk cans, that is, during the filling operation.

The numeral 31 designates a rod having a ball float 32 on its lower end which depends into the milk and shows the level thereof, this by way of an indicator 33 on the top of the rod, the indicator working through an appropriate guide 34. The header 15a (Figs. 1, 2 and 5) extends the full length of the cabinet, it can also be short of the full length, and it can be concealed in the insulated wall.

At this point, I desire to stress the use of the false bottom 10, this located above the main bottom and being arranged on a plane so that it provides the desired shelving facilities for the milk cans 11 and also provides, in conjunction with the main bottom, an intervening chamber or compartment 10a into which the used or returning spray water flows by way of the holes 17, for re-circulation or other disposal purposes. The water is drained out through the pipe 18 at one end of said compartment or chamber 10a. The lining 10b, if desired, is more or less an incidental feature. Therefore, the compartment idea and elevated bottom is one phase of seeming novelty. The particular door arrangement coacting with the platform or false bottom is to be further considered.

I desire to emphasize the importance of the showering and spraying pipe assembly or means in the upper ceiling portion of the chest or cabinet. The single intake and distributing and delivery pipe, for feeding the cold water in to start with is conveniently located and provided with simple branches which are parallel to one another and properly located with respect to the body and neck portions of the cans 11. These apertured or ported branch pipes serve as suitable nozzles for distributing the water over the outer surfaces of the milk cans. Cognizance should also be given the means whereby it is possible through the openings in the top of the cabinet to flow the milk evenly into the cans and to permit it to "film down" and around the walls or the interior surfaces of said walls during the watering and showering operation on the outside. It is of course possible to put loaded cans of milk into this cabinet and then turn the water on and cool the milk. However, it is my primary purpose to put the cans in while empty and to fill the cans slowly and at the same time to distribute the water or other cooling liquid around the exterior surfaces.

Small coolers may have but one door. Large models may have from two to four doors. Cans in small cabinets may be disposed in a single row; in larger cabinets they may be disposed in two, three or four rows. Spray nozzles can be used instead of holes in the pipes 16; provided spray nozzles prove to be more satisfactory for the purpose.

Revealing the different aspects of the invention and keeping in mind structural characteristics, it will be seen that the essence of the invention has to do with a cabinet having wall structure defining a compartment for receiving and enclosing empty milk cans for cooling and storage, a top wall of said wall structure having opening means therein affording access to said compartment, there being a drainage sump formed in the lower or basal portion of said cabinet, and means being confined in said compartment for spraying a cooling liquid exteriorly against the milk cans. In addition, means is provided for supporting the milk cans in upstanding alignment with the opening means in said top wall and in proper positions to receive the spray against the neck portions of the cans, this particular means comprising a perforated partition forming the bottom of the compartment and also the top of said drainage sump, and the second mentioned means comprising a liquid supplying header and a series of parallel pipes connected to the header pipe and extending at right angles from said header pipe and having perforations therein arranged to direct the cooling liquid from said pipes against the necks of the cans in said compartment.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

I claim:

1. The combination with a cabinet, having a wall structure enclosing a lacteal fluid container receiving compartment and a sump underlying said compartment for receiving drainage therefrom, of container supporting means within said compartment, container filling means, and container cooling means, a vertical part of said wall structure having door opening means therein to permit the insertion into and withdrawal from the compartment of containers, door means for said opening means, and the top of said wall structure having a predetermined number of openings therein; the container cooling means comprising a header in said cabinet and parallel pipes disposed in said compartment and connected to said header, each pipe having perforations therein arranged to discharge cooling liquid laterally therefrom and said pipes being arranged to present a set of discharge openings on each of two opposite sides of each space to be occupied by a container when in position to be filled; the container supporting means comprising a perforated partition forming the bottom of said compartment and the top wall of the drainage sump, said supporting means being so located with respect to the pipes that cooling liquid sprayed therefrom may shower the exterior of the neck portion of each container in position to be filled without entering the interior of the container; and the filling means comprising an element alined with the position to be occupied by the inner surface of the mouth of a container and having circumferentially distributed holes for feeding and discharging lacteal fluid in a thin annular film against said inner surface of said containers, and means for supplying said element with lacteal fluid from the exterior of the cabinet through the top of said wall structure.

2. A structural organization of the type defined in claim 1 in which the top surface of said container supporting means is in a horizontal plane in alignment with the bottom of said door opening means to facilitate insertion and removal of said containers.

3. An apparatus for cooling and storing milk comprising a cabinet having wall structure defining a compartment for receiving and enclosing empty milk cans for cooling and storage, a top wall of said wall structure having opening means therein affording access to said compartment, a drainage sump in the lower portion of said cabinet, means confined in said compartment for spraying a cooling liquid exteriorly against said cans, and means for supporting the milk cans in upstanding alignment with the opening means in said top wall and in positions to receive the spray against the neck portions of the cans, said means comprising a perforated partition forming the bottom of said compartment and the top of said sump, and the second-mentioned means comprising a liquid supplying header and series of parallel pipes connected thereto and having perforations therein arranged to direct the cooling liquid therefrom against the cans in said compartment.

4. Means for refrigeration and storage of milk in standard milk cans comprising a cabinet having end walls, a rear wall, a top wall and a front, all arranged and coacting to define a receiving compartment for said milk cans, a false bottom for said compartment coextensive in area with the cross-sectional area of said compartment and spaced downwardly from said top wall a distance such as to position the top edge of each can slightly below the under surface of said top wall, and means in said compartment for spraying cooling liquid on said cans; said front having an opening means to permit said cans to be introduced into or withdrawn from said compartment, and movable closure means for said opening means, said cabinet having arranged therein a drainage sump below said false bottom; the top wall of said cabinet having openings therein of approximately the same diameter as the flared mouth portions of said milk cans, the false bottom forming the top of said sump and having means arranged to discharge drainage into said sump, and said spraying means including a circulation header extending along one wall of the cabinet and having substantially parallel pipes connected thereto, said pipes having perforations therein arranged to discharge the cooling liquid in a downpour against the external neck portions of said milk cans when the latter are placed in said compartment with their flared mouth portions respectively in register with the openings in said top wall.

5. Means for refrigeration and storage of milk in standard milk cans comprising a cabinet having end walls, a rear wall, a top wall and a front, all arranged and coacting to define a receiving compartment for said milk cans, a false bottom for said compartment coextensive in area with the cross-sectional area of said compartment and spaced downwardly from said top wall a distance such as to position the top edge of each can slightly below the under surface of said top wall, and means in said compartment for spraying cooling liquid on said cans; said front having an opening means to permit said cans to be introduced into or withdrawn from said compartment, and movable closure means for said opening means, said cabinet having arranged therein a drainage sump below said false bottom; the top wall of said cabinet having openings therein of approximately the same diameter as the flared mouth portions of said milk cans, the false bottom forming the top of said sump and having means arranged to discharge drainage into said sump, and said spraying means arranged to discharge the cooling liquid in a downpour against the external neck portions of said milk cans when the latter are placed in said compartment with their flared mouth portions respectively in register with the openings in said top wall.

6. Apparatus for cooling and storing milk in cans, said apparatus comprising a cabinet having the wall structure thereof formed of opposing end elements, a front element and a rear element, said front element having opening means therein of a size to permit the passage of a standard milk can therethrough, closure means for said opening means, a top connected to said wall elements and defining therewith a compartment the reception of standard milk cans, and having opening means therein, filling means removably positioned in the first mentioned opening means, the lower portions of said wall elements forming a sump for receiving cooling liquid dripping from the outside surfaces of cans being sprayed, a partition having drainage means therein, and means in said compartment for spraying milk cans therein with liquid cooling medium, said partition forming the bottom of said compartment and the top of said sump and being spaced from said top a distance but slightly in excess of the height of a standard milk can, and said spraying means arranged to spray the exterior portions of the milk cans, each filling means including a funnel portion and a discharge portion connected to said funnel portion and constructed to apply milk to the inside of the mouth of a can in thin film form.

7. Apparatus for the cooling and storage of milk in cans, said apparatus comprising a cabinet having end walls and a rear wall, a top wall and a front, all arranged to define a can receiving compartment, a false bottom coextensive in area with the cross-sectional area of said compartment and spaced from said top wall a distance such as to locate the flared rim of a standard milk can slightly below the lower surface of said top wall, said front having opening means therein to permit one or more cans to be introduced into or withdrawn from said compartment, movable closure means for said opening means, said cabinet having arranged therein a sump below said false bottom for receiving liquid used in cooling said cans, and means for spraying cans in said compartment with cooling fluid; the top wall of said cabinet compartment having opening means therein each of somewhat the same diameter as the flared rim or mouth of a standard milk can, the false bottom forming the top of said sump and having drainage means arranged to discharge into said sump and said spraying means including a cooling liquid supply header extending into the compartment from the exterior thereof, and lateral branch pipes connected to said header and having spray-holes therein arranged to discharge and shower cooling liquid against the external neck portions of the milk cans when the latter are in predetermined positions in said compartment with their openings respectively in register with the opening means in said top wall.

8. Means for refrigeration and storage of milk in milk cans comprising a cabinet having vertical front and rear walls, connected by vertical end walls, and horizontal top and bottom walls, all arranged and coacting to define a compartment for milk cans, a false bottom horizontally arranged in said compartment and co-extensive in area with the cross-sectional area of said compartment and spaced downwardly from said top wall a distance such as to position the top edge of each can just slightly below the undersurface of said top wall, said front wall having opening means to permit said cans to be introduced into or withdrawn from said compartment, movable closure means for said opening means, said false bottom constituting a stand for said cans and arranged to be but a slight distance above a surface supporting said cabinet and being in alignment with the lower edge of said opening means to render easy the steps of inserting and removing said cans, said false bottom also coacting with adjacent cabinet walls to define a sub-compartment underlying said compartment, the top wall of said cabinet having selectively usable openings therein approximately the same in diameter as the mouth portions of said cans, removable covers for said openings, the latter affording access to said compartment and cans therein, and means for circulating a cooling medium around the cans in said compartment to cool the milk therein and to preserve the milk during storage.

9. An apparatus for cooling and storing milk comprising a cabinet having a wall structure embodying horizontal top and bottom walls and complemental vertical walls defining a compartment for receiving and enclosing empty milk cans for cooling and temporary storage, the top wall of said wall structure having opening means arranged therein for affording access to said compartment and to cans therein, readily applicable and removable cover means for said top opening means, at least one vertical wall of said cabinet having opening means to permit empty cans to be readily inserted in said compartment, movable closure means for said last-named opening means, and force fed refrigerating means for forcibly circulating a cooling medium over, around and in direct contact with said cans during the period when said cans are being filled and also while being stored.

10. An apparatus for cooling and storing milk comprising a cabinet having a wall structure defining a compartment for receiving and enclosing empty milk cans for cooling and temporary storage, the top wall of said wall structure having opening means therein affording access to said compartment, readily applicable and removable cover means for said top opening means, a side wall of said cabinet having opening means to permit empty cans to be readily inserted in said compartment, movable closure means for said last-named opening means, and force fed refrigerating means for forcibly circulating a cooling medium over, around and in direct contact with said cans during the period when said cans are being filled and also while being stored, the bottom of said cabinet and the bottom edging of said second-named opening means being but a slight distance above a surface supporting said cabinet to render easy the steps of inserting and removing the cans, and the vertical height of said compartment being such as to position the top portions of the cans just slightly below the underside of said top wall.

GEORGE R. DUNCAN.

REFERENCES CITED

The following references are of record in the file of this patent:

UNITED STATES PATENTS

| Number | Name | Date |
| --- | --- | --- |
| 2,315,603 | Duncan | Apr. 6, 1943 |
| 2,031,274 | McKay | Feb. 18, 1936 |
| 2,253,882 | Achs | Aug. 26, 1941 |
| 1,830,093 | Daniels | Nov. 3, 1931 |
| 1,398,787 | McLean | Nov. 29, 1921 |
| 2,131,423 | Babson | Sept. 27, 1938 |
| 2,140,895 | Bruce | Dec. 20, 1938 |
| 2,256,971 | Chamberlain | Sept. 23, 1941 |
| 2,380,901 | Chamberlain | July 31, 1945 |
| 2,172,577 | Duncan | Sept. 12, 1939 |
| 2,365,024 | Thomas | Dec. 12, 1944 |
| 1,186,944 | Rice | June 13, 1916 |
| 1,269,716 | King | June 18, 1918 |
| 2,146,058 | Doyle | Feb. 7, 1939 |
| 1,048,597 | Shephard | Dec. 31, 1912 |
| 1,049,901 | Mueller | Jan. 7, 1913 |